US012637087B2

(12) United States Patent
Colvin, Sr.

(10) Patent No.: US 12,637,087 B2
(45) Date of Patent: May 26, 2026

(54) STEERING WHEEL WITH BUILT-IN SNOOZE ALERT SYSTEM

(71) Applicant: Bobby Ray Colvin, Sr., Columbus, MS (US)

(72) Inventor: Bobby Ray Colvin, Sr., Columbus, MS (US)

( * ) Notice: Subject to any disclaimer, the term of this patent is extended or adjusted under 35 U.S.C. 154(b) by 40 days.

(21) Appl. No.: 18/920,583

(22) Filed: Oct. 18, 2024

(65) Prior Publication Data

US 2025/0042412 A1 Feb. 6, 2025

Related U.S. Application Data

(63) Continuation-in-part of application No. 17/539,845, filed on Dec. 1, 2021, now abandoned.

(60) Provisional application No. 63/130,284, filed on Dec. 23, 2020.

(51) Int. Cl.
*G08B 21/06* (2006.01)
*B60W 40/08* (2012.01)

(52) U.S. Cl.
CPC ............. *B60W 40/08* (2013.01); *G08B 21/06* (2013.01); *B60W 2040/0827* (2013.01)

(58) Field of Classification Search
CPC ......... B60W 40/08; B60W 2040/0827; B60W 50/14; B60W 2040/0818; B60W 2050/143; G08B 21/06; B60Q 5/005; B62D 1/046
USPC ................................................ 340/576, 575
See application file for complete search history.

(56) References Cited

U.S. PATENT DOCUMENTS

| | | | | | |
|---|---|---|---|---|---|
| 6,016,103 | A * | 1/2000 | Leavitt | ................... | G08B 21/06 |
| | | | | | 473/202 |
| 6,575,902 | B1 * | 6/2003 | Burton | ................... | A61B 5/398 |
| | | | | | 600/595 |
| 7,868,770 | B2 * | 1/2011 | Al-Mutairi | ............. | G08B 21/06 |
| | | | | | 340/576 |
| 8,983,732 | B2 * | 3/2015 | Lisseman | ............. | B60K 28/066 |
| | | | | | 701/45 |
| 9,159,221 | B1 * | 10/2015 | Stantchev | .............. | G08C 17/02 |
| 9,248,851 | B2 * | 2/2016 | Van'tZelfde | ........... | B62D 1/046 |
| 2011/0284304 | A1 * | 11/2011 | Van Schoiack | ....... | B60W 40/08 |
| | | | | | 180/272 |
| 2014/0139655 | A1 * | 5/2014 | Mimar | .............. | G08B 21/0476 |
| | | | | | 340/575 |
| 2017/0021862 | A1 * | 1/2017 | Akatsuka | .............. | B60W 50/14 |
| 2017/0101111 | A1 * | 4/2017 | Fung | ...................... | B60K 35/81 |
| 2017/0240158 | A1 * | 8/2017 | Yamaguchi | ............ | B62D 15/02 |
| 2017/0282792 | A1 * | 10/2017 | Illy | ...................... | B60W 40/08 |
| 2018/0174457 | A1 * | 6/2018 | Taylor | ...................... | G06N 3/09 |
| 2020/0041680 | A1 * | 2/2020 | Okazaki | ................. | G01V 3/088 |
| 2020/0080851 | A1 * | 3/2020 | Edwards | ............. | G01C 21/343 |
| 2020/0216079 | A1 * | 7/2020 | Mahajan | .......... | B60W 60/0051 |

(Continued)

*Primary Examiner* — Naomi J Small

(57) ABSTRACT

A system is described with a steering wheel featuring an integrated snooze alert unit and microcontroller. It monitors steering wheel pressure, compares it to baseline data, and detects changes to assess driver drowsiness or any abnormal driving behaviors. Using a trained model and expert modules, it diagnoses issues and determines probabilities of drowsiness. Restoration tasks, such as alerts, are executed based on these probabilities. Post-restoration, pressure data is monitored to generate new training data for a second model, enhancing the system's ability to alert the driver and maintain alertness, ensuring safe driving conditions.

20 Claims, 7 Drawing Sheets

(56) References Cited

U.S. PATENT DOCUMENTS

2020/0307646 A1*  10/2020  Kato  ....................  B60W 50/00
2023/0075782 A1*   3/2023  Co  .......................  A61B 5/7264

* cited by examiner

STEERING WHEEL WITH BUILT-IN SNOOZE ALERT SYSTEM

FIELD OF THE INVENTION

The present disclosure generally relates to an alert system. More particularly, the present disclosure describes a system designed to provide alerts to drivers who may be experiencing drowsiness while operating a vehicle.

BACKGROUND OF THE INVENTION

A system designed to provide alerts to drivers who may be experiencing drowsiness while operating a vehicle is in demand. Road accidents resulting from drivers dozing off are common on highways and long roads. Existing systems have been developed to address this issue, including those that detect drowsy drivers to prevent accidents and those that monitor facial characteristics to anticipate and alert drivers of drowsiness. Additionally, some systems focus on driver fatigue monitoring to address the loss of vehicle control when drivers fall asleep.

Despite these advancements, significant challenges and limitations persist. Many current solutions rely on complex technologies such as facial recognition or require extensive vehicle modifications, which can be costly and difficult to implement. Moreover, these systems may not effectively detect subtle signs of drowsiness, such as a gradual loosening of grip on the steering wheel, often the first indication of a driver beginning to fall asleep.

There is a clear need for a more efficient, cost-effective system that can seamlessly integrate with existing vehicle components to provide timely alerts to drivers at risk of drowsiness. Such a system should be easy to install, utilize the vehicle's existing power supply, and offer reliable performance without requiring extensive modifications or reliance on external sensors.

The present invention is intended to address problems associated with and/or otherwise improve on conventional devices through an innovative alert device that is designed to provide convenient, effective, and inexpensive installation while offering high levels of performance and incorporating other problem-solving features.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

In one embodiment, the present invention provides a system designed to enhance driver safety by detecting drowsiness or abnormal driving behaviors through a steering wheel integrated with a snooze alert unit and microcontroller. The system continuously monitors steering wheel pressure, comparing it to established baseline data to identify any deviations.

Utilizing a trained model and expert modules, the system diagnoses potential issues and calculates the likelihood of driver drowsiness or other irregularities.

Based on these probabilities, it determines and executes appropriate restoration tasks, such as issuing alerts to the driver.

After performing these tasks, the system continues to monitor pressure data, generating new training data to refine a second model. This model is deployed to improve the system's ability to alert drivers effectively, ensuring optimal functionality and promoting safe driving conditions.

DETAIL DESCRIPTIONS OF THE INVENTION

All illustrations of the drawings are for the purpose of describing selected versions of the present invention and are not intended to limit the scope of the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

In reference to FIG. 1 through FIG. 6, the present invention pertains to an advanced vehicular safety apparatus specifically engineered to mitigate the risks associated with driver drowsiness.

The present invention integrates a snooze alert system within the steering wheel 1, designated as the snooze alert unit 2. Its primary objective is to alert drivers who might fall asleep or snooze while operating a vehicle. The snooze alert unit 2 is part of the steering wheel 1, designed to notify the driver upon detecting a loosened grip from both hands, thereby ensuring the driver remains attentive.

Powered by the vehicle's existing battery, the snooze alert unit 2 eliminates the need for additional power sources, thereby maintaining the vehicle's efficiency. This system operates via ergonomically integrated buttons or switches on the steering wheel 1 or through wireless communication technologies such as Bluetooth, enhancing both usability and safety. The compact and efficient design of the alert mechanism directly integrates into existing vehicle infrastructure, providing significant benefits to both vehicle occupants and other road users.

Figure 1:
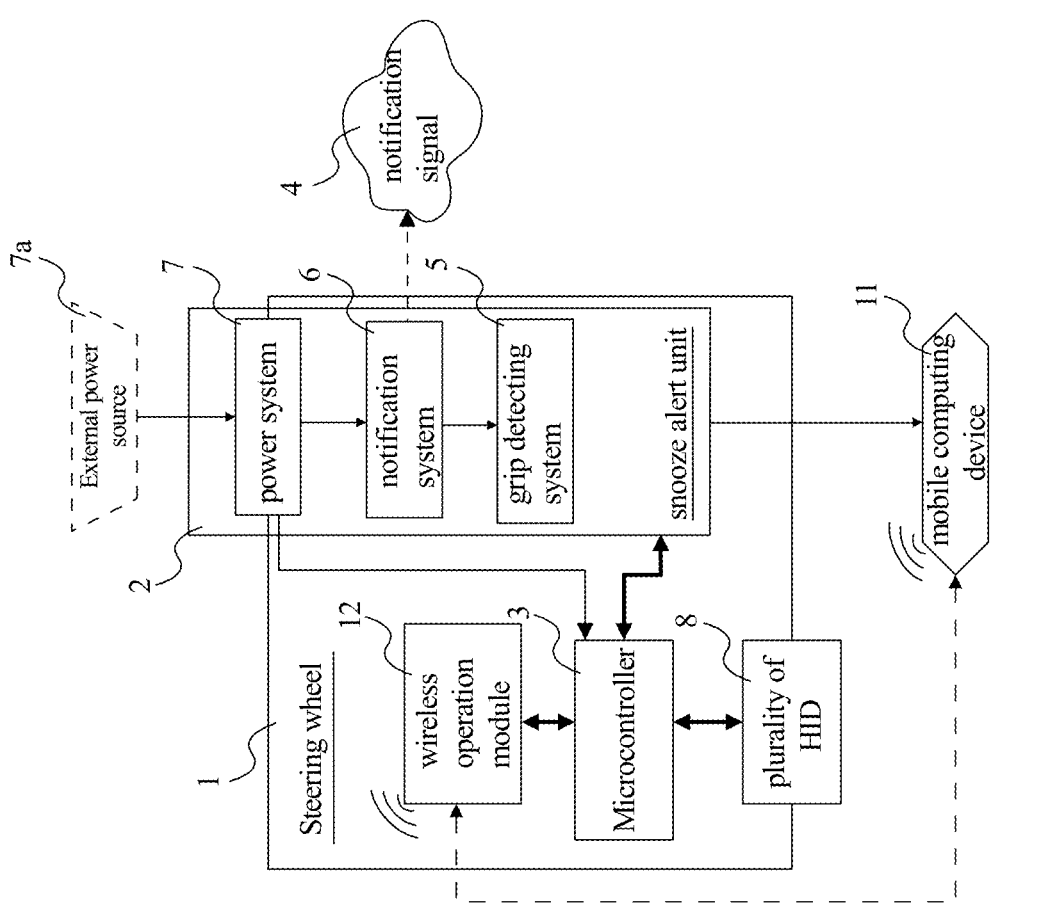
FIG. 1 is a block diagram showing one embodiment of the present invention, wherein thinner flowlines represent electrical connections between components, thicker flowlines represent electronic connections between components, and dashed flow lines represent connection between components that are communicably coupled.
Figure 2:
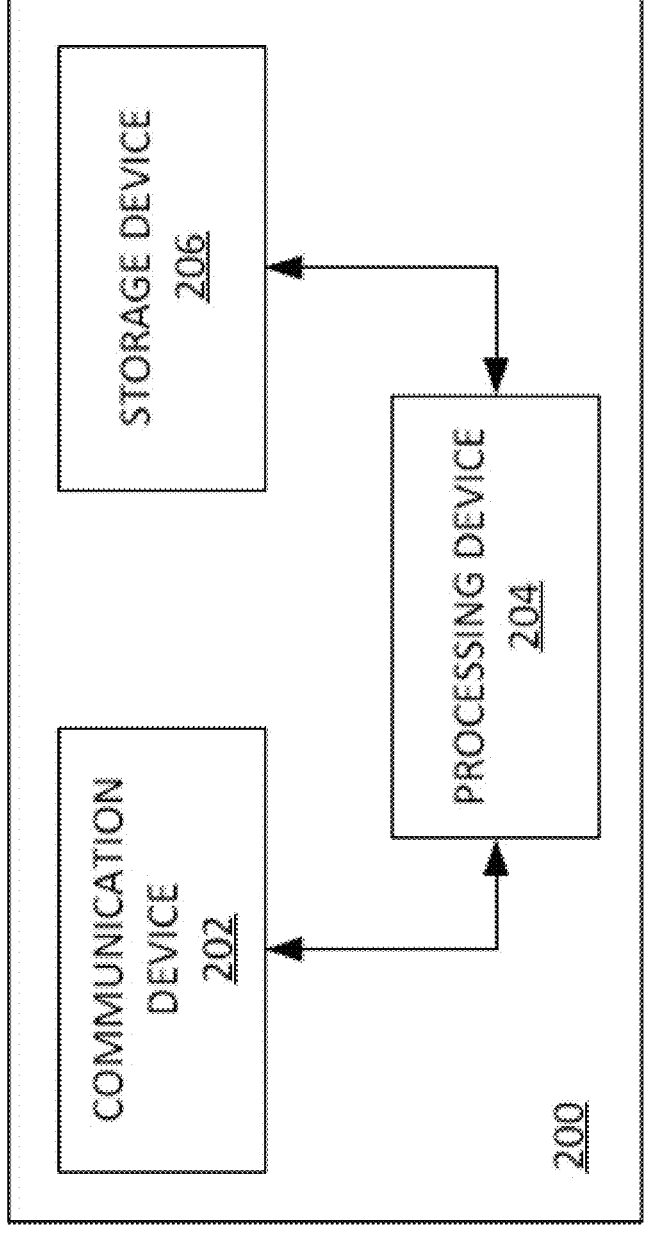
FIG. 2 is a block diagram showing one embodiment of the processing device, communication device and the storage device of the present invention.

Illustrated in FIG. 2, the invention includes a block diagram of the system (200), comprising a communication device 202, a processing device 204, and a storage device 206, all critical to its operation.

In some embodiments, the snooze alert unit 2 may comprise essential subsystems: a grip detecting system 5, a notification system 6, and a power system 7, all managed by an embedded microcontroller 3.

In some embodiments, the microcontroller 3 may be configured to interpret data from the grip detecting system 5 and manage the electrical components to deliver quick and effective alerts. The grip detecting system 5, in certain embodiments, can be integrated into this microcontroller as a communication device 202. It may also, in some embodiments, be externally mounted and integrated around the steering wheel's surface, utilizing sensors to detect a reduction or change in grip strength below a predefined threshold.

When such a decrease or change is detected, the grip detecting system 5 may send an activation signal to the notification system 6. This subsystem then produces a notification signal 4 to alert the driver, utilizing vibrations, low-power electric shocks, or audible alarms each designed to wake the driver without causing a startle.

Power activation within the system can be managed by an on/off button, accompanied by a green light to indicate activation status. The control mechanism automatically turns the system on when gripping or squeezing the steering wheel 1, deactivating it upon release.

In some embodiments, the system may feature a multifunctional control button, enabling several safety functions:

Hazard Lights: Automatically activated to warn surrounding traffic during emergencies.

Cruise Control: Maintains a consistent vehicle speed of 30 mph, adjustable by the driver through the foot pedal.

Emergency Sounds: Emits loud alerts to notify and increase safety awareness among nearby traffic.

Additionally, the notification system 6 can connect with external systems such as the vehicle's audio system, external speakers, computing devices, and display devices, facilitating enhanced alert notification capabilities. The power system 7 is linked to the vehicle's external battery source (7a), ensuring reliable operation. Alternative power options, including rechargeable or solar converters, may also be utilized.

In supplemental embodiments, various user interfaces are incorporated into the steering wheel 1 through a plurality of human interface devices (HID) 8. These devices allow adjustment of notification preferences, such as sound selection, volume, alert durations, and emergency contact setup, and allow control of the system. A set of shut-off buttons 9 is strategically located around the steering wheel 1 to facilitate easy system deactivation in emergencies. In some embodiments, a smart phone 106 or a computing device 2600 may be connected to the system or the steering wheel 1 to function as the human interface devices (HID) 8.

Figure 3:
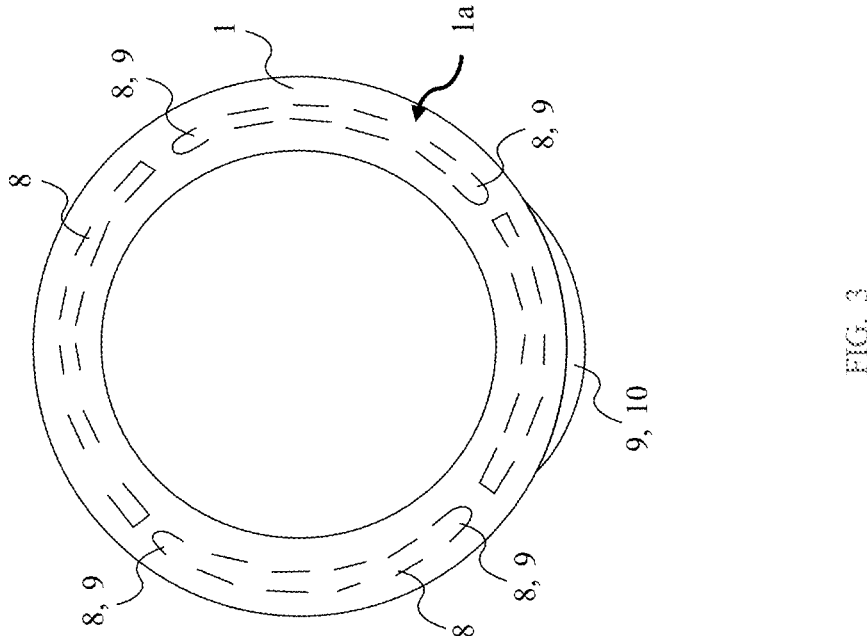
FIG. 3 is an illustration showing one embodiment of the steering wheel of the present invention.

In the preferred embodiment, the snooze alert unit 2 is seamlessly integrated into the existing steering wheel 1 and manipulated by the driver 112. As seen in FIG. 3, the system includes a plurality of human interface devices (HID) 8 for user interaction, facilitating selection of notification types, intervals, and more. These HIDs are distributed along a first surface 1a of the steering wheel 1 and electronically connected to the microcontroller 3. They include shut-off buttons 9 for emergency system deactivation, designed for easy access and manual control.

Figure 4:
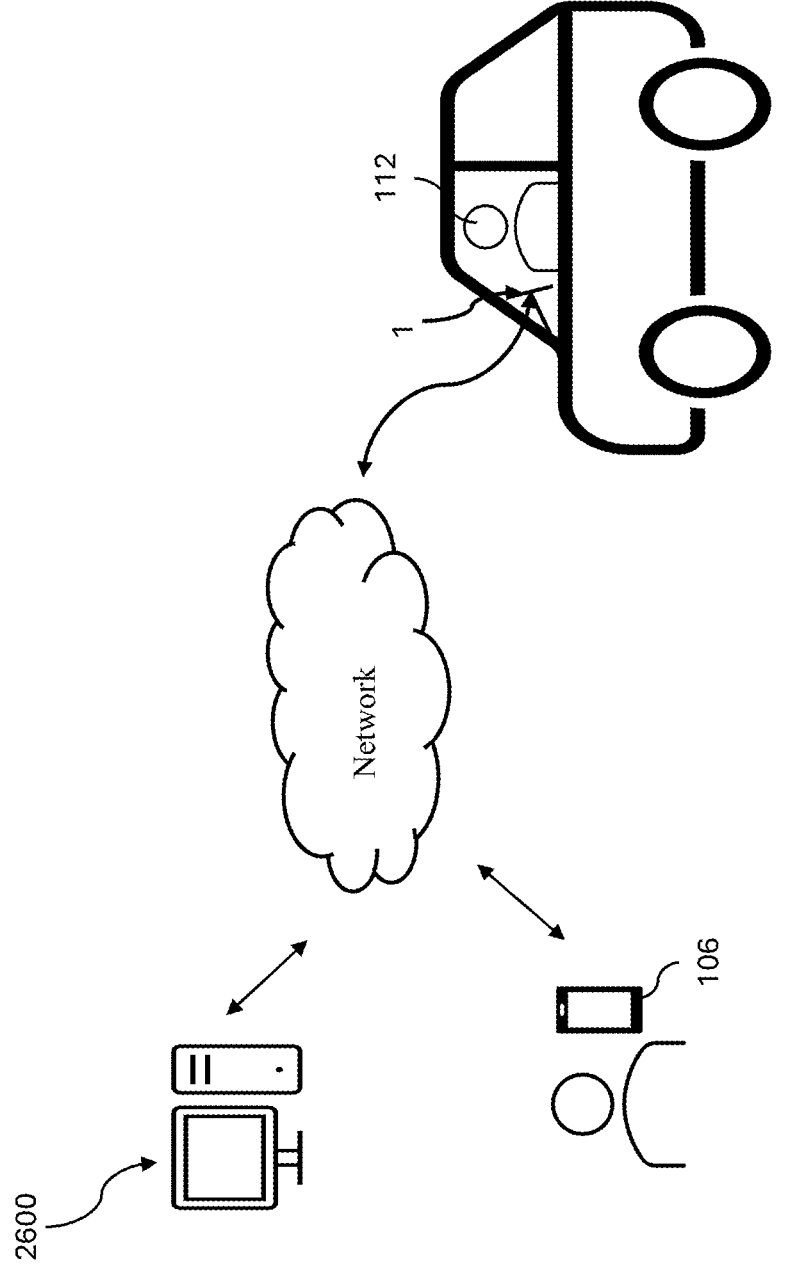
FIG. 4 is an illustration showing one embodiment of the computing device and user connected to the present invention.

In some embodiments, enhanced remote operation capabilities can be provided via a mobile computing device 11 (which can be the computing device 2600 as shown in FIG. 4) and a wireless operation module 12. These components may interface with the microcontroller 3, enabling management through mobile phones or remote devices using wireless standards like Bluetooth, Wi-Fi, GSM, or ZigBee. This setup may support both manual and voice-activated operations, offering user flexibility in managing the system.

In some other embodiments, the present invention may incorporate AI with machine learning algorithms to enhance predictive capabilities, using a sophisticated artificial neural network (ANN). This network adapts to individual driving habits, dynamically adjusting alert thresholds to provide timely, accurate notifications without unnecessary disturbance.

The present invention significantly advances vehicular safety technology by providing an innovative, integrated approach to drowsiness detection. Its sophisticated and user-friendly design not only enhances safety for vehicle occupants but also protects fellow road users by leveraging cutting-edge AI and sensor technologies, establishing a new standard for smart vehicular safety systems.

In one embodiment, the communication device 202 of the present invention shown in FIG. 2 may be configured to obtain information regarding pressure of the steering wheel 1.

The present invention may utilize this information to alert users or perform actions according to the pressure data achieved. To monitor the pressure of the steering wheel 1, the communication device 202 of the present invention may include one or more sensors that can be installed within the steering wheel 1 and communicate with the processing device 204 of the present invention. The present invention may further process the sensor data using the processing device 204 to determine when the pressure of the steering wheel 1 is in normal condition and relevant information regarding the steering wheel 1.

In some embodiments, the communication device 202 may communicate with the processing device 204 via a network. The communication device 202 may communicate with the processing device 204 via the network to allow the storage device 206 to record information regarding steering wheel usage or pressure of the steering wheel 1. The storage device 206 may use one or more servers or network to receive data from the communication device 202 or the processing device 204, store the received data, process the received data, and/or communicate information associated with the received or processed data.

In some embodiments, the communication device (e.g., sensors) 202 may be disposed within or communicatively connected to one or more processing device 204, which may be permanently or removably installed in the computing device 2600 and/or the steering wheel 1. The processing device 204 may interface with the one or more sensors and related devices (e.g., a digital camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, etc.). In some embodiments, sensors may be integrated into the computing device 2600, allowing it to be positioned within a vehicle to monitor user behavior while driving. This setup provides additional information that can assist in determining whether the user is in a drowsy, inactive, or anomalous state.

The communication device 202 may further include a communication component to transmit information to and receive information from external sources, including internet, or electronic devices, video devices connected to the present invention.

Figure 5:
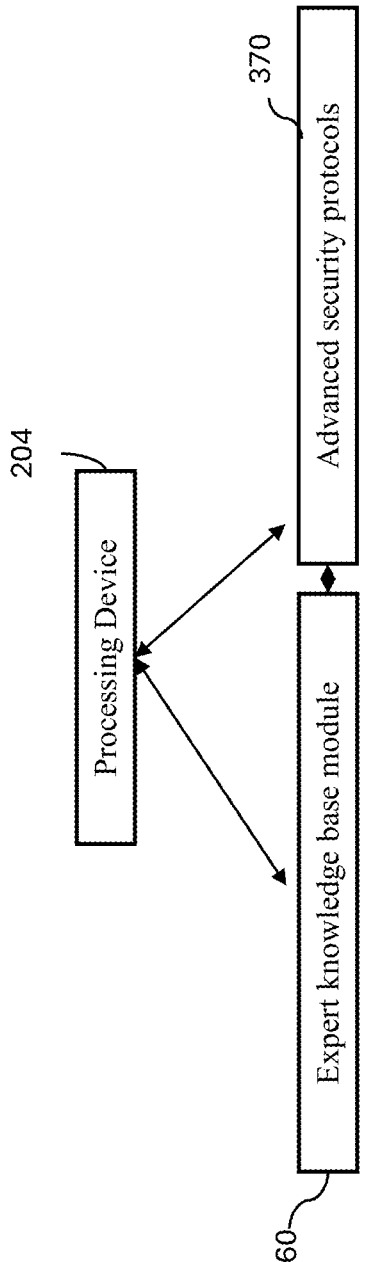
FIG. 5 is a block diagram showing one embodiment of the processing device, Expert knowledge base module and the advanced security protocols of the present invention.

In some embodiments, as shown in FIG. 5, the processing device 204 may be configured to perform diagnosis in communication with and based on an expert knowledge base module 360 and an artificial intelligence module 370 for acquiring a fault pressure recognition algorithm preset by the system for fault pressure types, fault pressure locations and fault pressure degrees of major fault pressure locations and failure modes of the fault pressures in a supervised or unsupervised learning mode, so that an automatic fault distinguishing and classifying function if needed can be provided for monitoring devices (e.g., sensors) included in the communication device 202. The pressure monitored from the steering wheel 1 can be in different types. The pressure types that can be monitored on a steering wheel 1 may include firm pressure, soft pressure, sliding pressure, pinching pressure, and tapping pressure; these pressure information can provide insights into the driver's state of mind and driving behavior, potentially enhancing safety features in vehicles. The fault pressure types, fault pressure locations and failure mode can be determined when comparing the normal pressures with abnormal pressure or abrupt changes of the pressure while driving.

In some embodiments, by combining pressure information from the steering wheel 1 with sensors or cameras that detect and analyze the driver's facial movements, the system can determine or increase accuracy of determination of whether the driver is drowsy or not in a normal driving state.

The expert knowledge base module 360 may include data regarding operation of steering wheel 1 and normal pressure in driving state with expert knowledge which can be updated via the communication device 202 (which can obtain information via internet) and, in some embodiments, may provide a management configuration interface, and the user performs operations such as updating and editing on the contents in the expert knowledge base module 360.

The artificial intelligence module 370 can be based on neural networks, pattern recognition, machine learning, genetic algorithms, genetic programming and other artificial intelligence theories to realize signal processing and feature extraction of complex signals, operation state recognition and reliability analysis of the computing device 2600 or similarly complex equipment.

Steering wheel operation data and steering wheel pressure data may include image data from multiple state of steering wheels in different angles with driver hands locations. The pressure data of the steering wheel 1, in some embodiments, may include sequential temporal data corresponding to observed status of the various angles of the steering wheel 1. As a result, the training data that can be used in the present invention and for a training method may include received sensor data with time-ordered sequences of the extracted pressure information (e.g., temporal sequences of observed status of the pressure of the steering wheel 1).

A trained model used in the present invention can be a generative artificial intelligence (AI) model comprising a transformer deep learning neural network.

In some embodiments, the present invention may include a first trained model for training with operation data and or pressure data for finding out faults or changes of pressure and a second trained model for training with the operating data and or the pressure data after performing the one or more restoration task to alert users or preform necessary actions for finding out proper restoration. The restoration refers to the system's role in restoring the driver's alertness and attentiveness, thereby returning them to a safe and normal driving condition. The actions that can be performed include monitoring the driver's movements using cameras or sensors, slowing down the vehicle, vibrating the seat, lighting, making sounds or issuing a voice command to ask if the driver is okay.

In some embodiments, the storage device 204 may feature a restoration database that comprises a library of restoration (awakening/alerting) instructions and identification diagrams for various state of steering wheel 1 and drivers driving state including speed of the vehicle and rotating speed of the steering wheel 1. Additionally, the database can facilitate the updating of these instructions and identification diagrams using predictive algorithms to ensure that updates are consistently maintained. The library of restoration instructions may include one or more known or predetermined restoration tasks.

Figure 6:
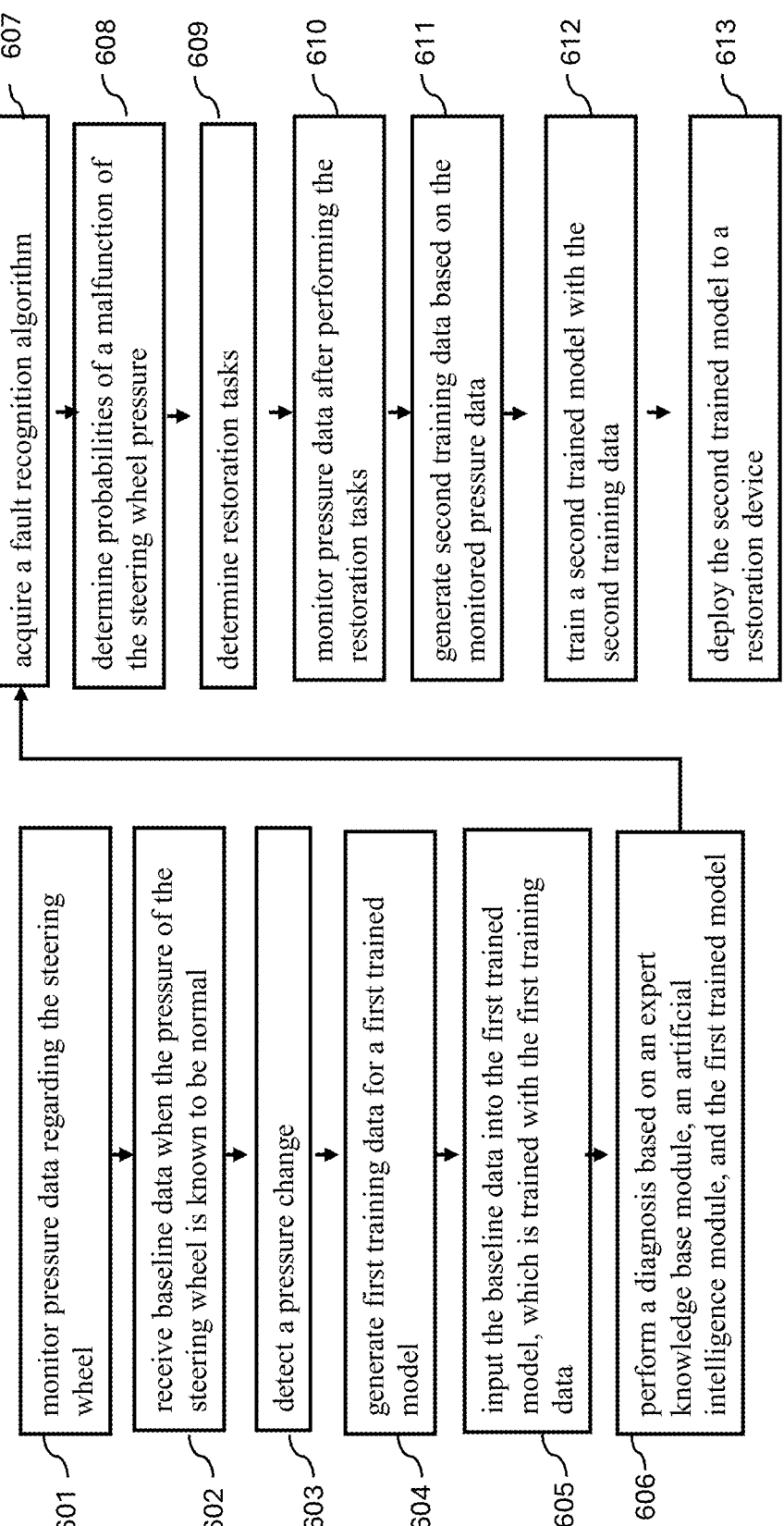
FIG. 6 is an illustration showing one embodiment of the steps configured in the microcontroller of the present invention.

As shown in FIG. 6, in one embodiment, the present invention provides a microcontroller configured to:

monitor pressure data regarding the steering wheel 1 using a communication device at 601;

receive baseline data when the pressure of the steering wheel 1 is known to be normal at 602.

The baseline data can be related to a baseline pressure of a steering wheel 1. The baseline data may include historical steering wheel usage and associated pressures or information related to distribution of pressures on steering wheels from internet or a relevant network.

The microcontroller can be further configured to: detect a pressure change based on the pressure data and the baseline data at 603; generate first training data for a first trained model at 604; input the baseline data into the first trained model, which is trained with the first training data at 605.

The microcontroller can be configured to perform a diagnosis using a processing device based on an expert knowledge base module, an artificial intelligence module, and the first trained model at 606. The diagnosis is to find out malfunction or abnormality of the pressure on the steering wheel 1 and may include comparison between the baseline data and the detected pressure change of the steering wheel 1.

The microcontroller can be configured to acquire a fault recognition algorithm based on the diagnosis at 607. The fault recognition algorithm can be preset by the user or the system of the present invention or acquired via internet or a network. In some embodiments, the fault recognition algorithm can be identified by an expert knowledge base module 360 and an artificial intelligence module 370 as described above.

The microcontroller can be further configured to determine probabilities of a malfunction of the steering wheel pressure using the fault recognition algorithm at 608; determine restoration tasks based on the probabilities and a restoration database at 609; monitor pressure data after performing the restoration tasks at 610. This step 610 is to check if the issues or fault is fixed by the restoration task. In other words, the system checks if the driver is in normal state. Next, the microcontroller can be further configured to generate second training data based on the monitored pressure data at 611. The second training data may include received sensor data with time-ordered sequences of the extracted pressure information after performing the restoration task, and information related to success or failure of the restoration task in resolving the problems.

The microcontroller can be further configured to train a second trained model with the second training data at 612; and deploy the second trained model to a restoration device configured to perform the restoration tasks at 613. The restoration devices may include software alert programs (including that is configured to generate lighting on screen displays), hardware alert devices (e.g., seat vibrators, decelerators, or brake systems) or warning devices (e.g., speakers, lights, or electrical shock devices) which may be preinstalled in or connected to the microcontroller. The restoration task includes troubleshooting and alerting a user to apply sufficient pressure on the steering wheel 1.

In some embodiments, the microcontroller can be further configured to: provide user authentication using advanced security protocols, including face scans, voice recognition, fingerprints, and ID numbers for access control. The authentication may include displaying a question for password and IDs that can be preregistered or any other authentication process known in the art.

In some embodiments, the microcontroller can be further configured to: interface with a user interface configured to supply information to and/or receive information from the user; and receive, via the user interface, a submission request to generate and train the second trained model for the restoration task.

In some embodiments, the microcontroller can be further configured to provide customization options allowing users to add other primary users with permissions through an approval process. The customization options may include displaying questions regarding number of additional users and user profiles.

In some embodiments, the microcontroller can be further configured to provide updates and learning mechanisms that enable the system to counter new threats by regularly updating its virus definition database. The updates can be done by replacing the old version to a new version and the learning mechanism can be the usage duration of the old version without updates and historical number of updates to learn update needs.

In some embodiments, the microcontroller can be further configured to provide security measures that automatically scan documents and websites for safety. The security measures can be providing virus scan software known in the art using the real time internet search or based on the expert knowledge base module, that can be run under the user permissions.

In some embodiments, the microcontroller can be further configured to manage a backup and recovery system that ensures data integrity and facilitates quick recovery in case of failure. The backup and recovery system can be a backup and recovery software or similar functioning software known in the art.

In some embodiments, the microcontroller can be further configured to provide energy-efficient modes that conserve power by entering sleep mode and shutting down during periods of inactivity. The energy-efficient modes can be configured to turn on the sleep mode or shut down when the steering wheel 1 is not used by the user or vehicle is not running or turned off.

In some embodiments, the microcontroller can be further configured to update a library of algorithms with data retrieved from the internet and communication with video devices and televisions. The library of restoration instructions may include how the identified problem should be solved by which restoration tasks or which software or devices.

In some embodiments, the restoration task may include sending a signal to a vibration device placed in a seat to vibrate the seat so that the driver can be alerted.

In some other embodiments, the restoration task may involve sending a signal to a lighting device to direct the lights towards the driver's face.

In one embodiment, the present invention provides an artificial intelligence apparatus for generating training data, comprising: a memory configured to store a target artificial intelligence model; and a processor configured to perform the method or process configured in the microcontroller described above.

Figure 7:
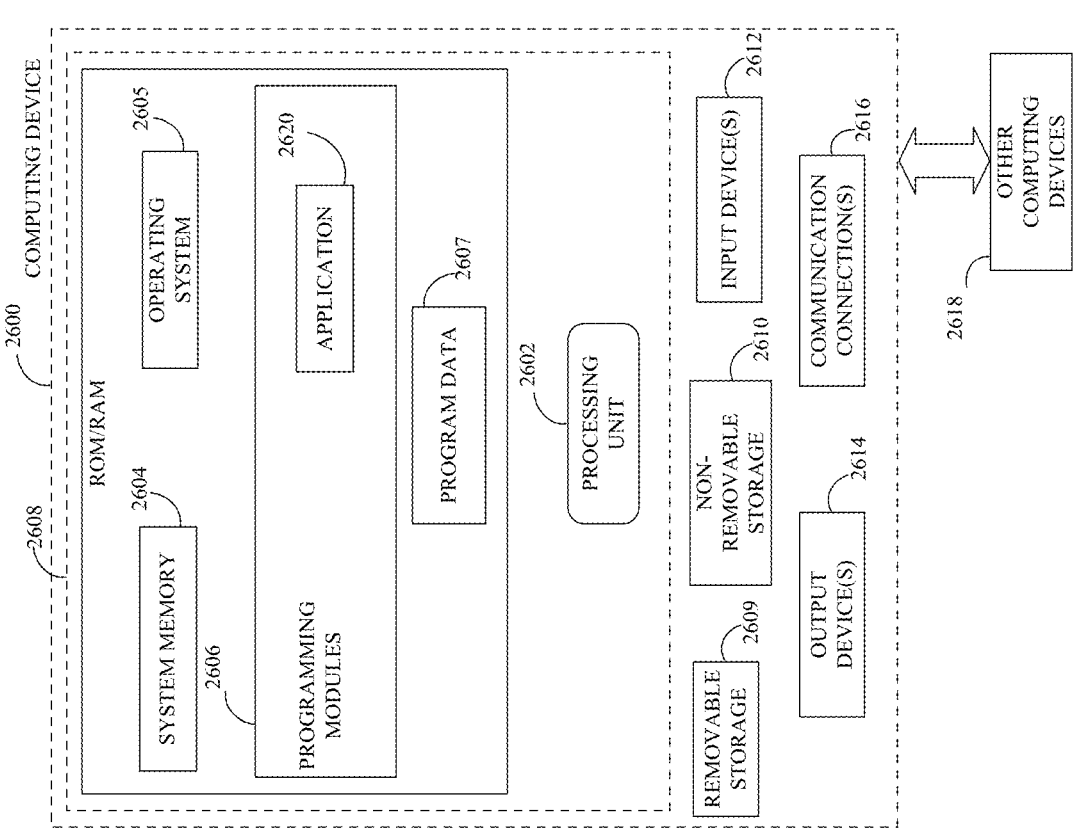
FIG. 7 is a block diagram of a computing device, in accordance with some embodiments.

With reference to FIG. 7, a system consistent with an embodiment of the disclosure may include a computing device or cloud service, such as computing device 2600. In a basic configuration, computing device 2600 may include at least one processing unit 2602 and a system memory 2604. Depending on the configuration and type of computing device, system memory 2604 may comprise, but is not limited to, volatile (e.g. random-access memory (RAM)), non-volatile (e.g. read-only memory (ROM)), flash memory, or any combination. System memory 2604 may include operating system 2605, one or more programming modules 2606, and may include a program data 2607. Operating system 2605, for example, may be suitable for controlling computing device 2600's operation. In one embodiment, programming modules 2606 may include image-processing module, machine learning module, etc. Furthermore, embodiments of the disclosure may be practiced in conjunction with a graphics library, other operating systems, or any other application program and is not limited to any particular application or system. This basic configuration is illustrated in FIG. 7 by those components within a dashed line 2608.

Computing device 2600 may have additional features or functionality. For example, computing device 2600 may also include additional data storage devices (removable and/or non-removable) such as, for example, magnetic disks, optical disks, or tape. Such additional storage is illustrated in FIG. 7 by a removable storage 2609 and a non-removable storage 2610.

Computer storage media may include volatile and non-volatile, removable and non-removable media implemented in any method or technology for storage of information, such as computer-readable instructions, data structures, program modules, or other data. System memory 2604, removable storage 2609, and non-removable storage 2610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2600. Any such computer storage media may be part of device 2600. Computing device 2600 may also have input device(s) 2612 such as a keyboard, a mouse, a pen, a sound input device, a touch input device, a location sensor, a camera, a biometric sensor, etc. Output device(s) 2614 such as a display, speakers, a printer, etc. may also be included. The aforementioned devices are examples and others may be used.

Computing device 2600 may also contain a communication connection 2616 that may allow device 2600 to communicate with other computing devices 2618, such as over a network in a distributed computing environment, for example, an intranet or the Internet. Communication connection 2616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2604, including operating system 2605. While executing on processing unit 2602, programming modules 2606 may perform processes including, for example, one or more stages of methods, algorithms, systems, applications, servers, databases as described above. The aforementioned process is an example, and processing unit 2602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the invention has been explained in relation to its preferred embodiment, it is to be understood that many other possible modifications and variations can be made without departing from the spirit and scope of the invention as hereinafter claimed.

What is claimed is:
1. A system comprising:
a steering wheel;
a snooze alert unit integrated into the steering wheel;
a microcontroller electronically connected to the snooze alert unit, wherein the microcontroller is configured to:
monitor pressure data regarding the steering wheel using a communication device;

receive baseline data when the pressure of the steering wheel is known to be normal;

detect a pressure change based on the pressure data and the baseline data;

generate first training data for a first trained model;

input the baseline data into the first trained model, which is trained with the first training data;

perform a diagnosis using a processing device based on an expert knowledge base module, an artificial intelligence module, and the first trained model;

acquire a fault recognition algorithm based on the diagnosis;

determine probabilities of a malfunction of the steering wheel pressure using the fault recognition algorithm;

determine restoration tasks based on the probabilities and a restoration database;

monitor pressure data after performing the restoration tasks;

generate second training data based on the monitored pressure data;

train a second trained model with the second training data; and deploy the second trained model to a restoration device configured to perform the restoration tasks.

2. The system as claimed in claim 1, wherein the restoration task includes troubleshooting and alerting a user to apply sufficient pressure on the steering wheel.

3. The system as claimed in claim 1, the microcontroller is further configured to:

provide user authentication using advanced security protocols, including face scans, voice recognition, fingerprints, and ID numbers for access control;

interface with a user interface configured to supply information to and/or receive information from the user; and receive, via the user interface, a submission request to generate and train the second trained model for the restoration task.

4. The system as claimed in claim 3, wherein the microcontroller is further configured to provide customization options allowing users to add other primary users with permissions through an approval process.

5. The system as claimed in claim 3, wherein the microcontroller is further configured to provide updates and learning mechanisms that enable the system to counter new threats by regularly updating its virus definition database.

6. The system as claimed in claim 1, wherein the microcontroller is further configured to provide security measures that automatically scan documents and websites for safety.

7. The system as claimed in claim 6, wherein the microcontroller is further configured to manage a backup and recovery system that ensures data integrity and facilitates quick recovery in case of failure.

8. The system as claimed in claim 1, wherein the microcontroller is further configured to provide energy-efficient modes that conserve power by entering sleep mode and shutting down during periods of inactivity.

9. The system as claimed in claim 1, wherein the microcontroller is further configured to update a library of algorithms with data retrieved from the internet and communication with video devices and televisions.

10. A system comprising:

a steering wheel;

at least one camera communicatively connected to the steering wheel;

a snooze alert unit integrated into the steering wheel;

a microcontroller electronically connected to the snooze alert unit, wherein the microcontroller is configured to:

monitor pressure data regarding the steering wheel using a communication device;

receive baseline data when the pressure of the steering wheel is known to be normal;

detect a pressure change based on the pressure data and the baseline data;

generate first training data for a first trained model;

input the baseline data into the first trained model, which is trained with the first training data;

perform a diagnosis using a processing device based on an expert knowledge base module, an artificial intelligence module, and the first trained model;

acquire a fault recognition algorithm based on the diagnosis;

determine probabilities of a malfunction of the steering wheel pressure using the fault recognition algorithm;

determine restoration tasks based on the probabilities and a restoration database;

monitor pressure data after performing the restoration tasks;

generate second training data based on the monitored pressure data;

train a second trained model with the second training data; and deploy the second trained model to a restoration device configured to perform the restoration tasks that include slowing down and maintaining a vehicle speed at a speed of 30 mph.

11. The system as claimed in claim 10, wherein the restoration task includes troubleshooting and alerting a user to apply sufficient pressure on the steering wheel.

12. The system as claimed in claim 10, the microcontroller is further configured to:

provide user authentication using advanced security protocols, including face scans, voice recognition, fingerprints, and ID numbers for access control;

interface with a user interface configured to supply information to and/or receive information from the user; and receive, via the user interface, a submission request to generate and train the second trained model for the restoration task.

13. The system as claimed in claim 12, wherein the microcontroller is further configured to provide customization options allowing users to add other primary users with permissions through an approval process.

14. The system as claimed in claim 12, wherein the microcontroller is further configured to provide updates and learning mechanisms that enable the system to counter new threats by regularly updating its virus definition database.

15. The system as claimed in claim 10, wherein the microcontroller is further configured to provide security measures that automatically scan documents and websites for safety.

16. The system as claimed in claim 15, wherein the microcontroller is further configured to manage a backup and recovery system that ensures data integrity and facilitates quick recovery in case of failure.

17. The system as claimed in claim 10, wherein the microcontroller is further configured to provide energy-efficient modes that conserve power by entering sleep mode and shutting down during periods of inactivity.

18. The system as claimed in claim 10, wherein the microcontroller is further configured to update a library of algorithms with data retrieved from the internet and communication with video devices and televisions.

19. The system as claimed in claim 10, wherein the restoration task includes sending a signal to a vibration device placed in a seat.

20. The system as claimed in claim 10, wherein the restoration task includes sending a signal to a lighting device.

* * * * *